(12) United States Patent
Franceschini et al.

(10) Patent No.: US 7,969,346 B2
(45) Date of Patent: Jun. 28, 2011

(54) TRANSPONDER-BASED BEACON TRANSMITTER FOR SEE AND AVOID OF UNMANNED AERIAL VEHICLES

(75) Inventors: Michael R. Franceschini, Centerport, NY (US); David W. Meyers, Brooklyn Park, MN (US); Kelly P. Muldoon, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 458 days.

(21) Appl. No.: 12/246,644

(22) Filed: Oct. 7, 2008

(65) Prior Publication Data

US 2010/0085236 A1 Apr. 8, 2010

(51) Int. Cl.
  *G08G 5/04* (2006.01)
  *G01S 13/00* (2006.01)
  *G01S 13/74* (2006.01)

(52) U.S. Cl. ............... 342/30; 342/29; 342/42; 340/961

(58) Field of Classification Search .............. 342/29–51; 701/1–18; 340/945, 961, 963, 967, 971–981
See application file for complete search history.

(56) References Cited

U.S. PATENT DOCUMENTS

| | | | | |
|---|---|---|---|---|
| 4,104,638 A | * | 8/1978 | Middleton | 342/455 |
| 4,298,875 A | * | 11/1981 | Sullivan | 342/455 |
| 5,240,207 A | * | 8/1993 | Eiband et al. | 244/190 |
| 5,450,329 A | * | 9/1995 | Tanner | 701/213 |
| 5,570,095 A | * | 10/1996 | Drouilhet et al. | 342/357.07 |
| 5,574,648 A | * | 11/1996 | Pilley | 701/120 |
| 5,904,724 A | * | 5/1999 | Margolin | 701/120 |
| 6,167,238 A | * | 12/2000 | Wright | 455/66.1 |
| 6,278,396 B1 | * | 8/2001 | Tran | 342/29 |
| 6,448,929 B1 | * | 9/2002 | Smith et al. | 342/456 |
| 6,459,411 B2 | * | 10/2002 | Frazier et al. | 342/455 |
| 6,819,982 B2 | * | 11/2004 | Doane | 701/3 |
| 6,911,936 B2 | * | 6/2005 | Stayton et al. | 342/182 |

(Continued)

FOREIGN PATENT DOCUMENTS

WO 0041000 7/2000

(Continued)

OTHER PUBLICATIONS

European Patent Office, "European Search Report", Feb. 10, 2010, Published in: EP.

(Continued)

*Primary Examiner* — Thomas H Tarcza
*Assistant Examiner* — Peter Bythrow
(74) *Attorney, Agent, or Firm* — Fogg & Powers LLC

(57) ABSTRACT

A transponder-based beacon transmitter system in an unmanned aerial vehicle is provided. The transponder-based beacon transmitter system comprises a global positioning system interface communicatively coupled to receive position information indicative of a current location of the unmanned aerial vehicle, a message formatter communicatively coupled to the global positioning system interface, and a transponder-based beacon transmitter. The message formatter formats vehicle identification of the unmanned aerial vehicle and the position information indicative of the current location of the unmanned aerial vehicle into an automatic dependent surveillance broadcast mode-select squitter message. The message formatter operates in one of a military mode, a National Airspace System mode, and a combined military/National Airspace System mode. The transponder-based beacon transmitter transmits the automatic dependent surveillance broadcast mode-select squitter messages from the unmanned aerial vehicle. Receivers in the vicinity of the unmanned aerial vehicle receive unsolicited vehicle identification and location of the unmanned aerial vehicle.

20 Claims, 4 Drawing Sheets

U.S. PATENT DOCUMENTS

| | | | | |
|---|---|---|---|---|
| 6,926,233 | B1* | 8/2005 | Corcoran, III | 244/76 R |
| 6,967,616 | B2* | 11/2005 | Etnyre | 342/182 |
| 7,006,032 | B2* | 2/2006 | King et al. | 342/29 |
| 7,130,741 | B2 | 10/2006 | Bodin et al. | 701/206 |
| 7,307,579 | B2* | 12/2007 | Rees et al. | 342/29 |
| 7,349,774 | B2* | 3/2008 | Werback | 701/3 |
| 7,414,567 | B2* | 8/2008 | Zhang et al. | 342/29 |
| 7,479,919 | B2* | 1/2009 | Poe et al. | 342/30 |
| 7,515,091 | B2* | 4/2009 | Meyers et al. | 342/57 |
| 7,693,617 | B2* | 4/2010 | Dockter et al. | 701/3 |
| 7,706,979 | B1* | 4/2010 | Herwitz | 701/301 |
| 7,724,178 | B2* | 5/2010 | Brandao et al. | 342/29 |
| 2002/0011950 | A1* | 1/2002 | Frazier et al. | 342/357.08 |
| 2002/0154061 | A1* | 10/2002 | Frazier et al. | 342/455 |
| 2003/0122666 | A1* | 7/2003 | John et al. | 340/539.13 |
| 2003/0233192 | A1* | 12/2003 | Bayh et al. | 701/301 |
| 2004/0174295 | A1* | 9/2004 | Stayton et al. | 342/182 |
| 2005/0156777 | A1* | 7/2005 | King et al. | 342/29 |
| 2006/0235584 | A1* | 10/2006 | Fregene et al. | 701/23 |
| 2006/0253254 | A1* | 11/2006 | Herwitz | 701/301 |
| 2007/0018881 | A1* | 1/2007 | King | 342/46 |
| 2007/0132638 | A1* | 6/2007 | Frazier et al. | 342/455 |
| 2007/0152814 | A1* | 7/2007 | Stefani | 340/539.22 |
| 2007/0222665 | A1* | 9/2007 | Koeneman | 342/29 |
| 2007/0252748 | A1* | 11/2007 | Rees et al. | 342/29 |
| 2007/0288132 | A1* | 12/2007 | Lam | 701/23 |
| 2009/0118875 | A1* | 5/2009 | Stroud | 701/3 |
| 2009/0303081 | A1* | 12/2009 | Annati et al. | 340/945 |
| 2010/0066604 | A1* | 3/2010 | Limbaugh et al. | 342/357.03 |
| 2010/0085236 | A1* | 4/2010 | Franceschini et al. | 342/30 |

FOREIGN PATENT DOCUMENTS

| | | |
|---|---|---|
| WO | 2005052887 | 6/2005 |
| WO | 2006124063 | 11/2006 |

OTHER PUBLICATIONS

Strain et al., "A Lightweight, Low-Cost ADS-B System for UAS Applications", "http://www.mitre.org/work/tech_papers/tech_papers_08/07_0634/07_0634.pdf", 2007, pp. 1-9.

"Unmanned Aerial Vehicles", "Report on EUROCAE Working Group 73", Apr. 21, 2006, Publisher: EUROCAE W/G 73.

* cited by examiner

TRANSPONDER-BASED BEACON TRANSMITTER FOR SEE AND AVOID OF UNMANNED AERIAL VEHICLES

GOVERNMENT LICENSE RIGHTS

The U.S. Government may have certain rights in the present invention as provided for by the terms of Government Contract HR0011-08-C-0024.

BACKGROUND

The airspace above the modern battlespace is becoming increasingly congested, making effective coordination, integration, and deconfliction by friendly forces a growing challenge. This modern airspace clutter is now being exacerbated by the combined use of manned and unmanned aerial vehicles operating in close proximity to each other. Unmanned aerial vehicles pose significant challenges to airspace deconfliction due to their agility, small size, and increasing density in the airspace. The unmanned aerial vehicles create a potential friendly-aircraft-collision hazard in military airspace. The number of unmanned aerial vehicles in commercial airspaces is expected to increase so that unmanned aerial vehicles are expected to create a potential friendly-aircraft-collision hazard in commercial airspace.

Identifying air assets in the combat zone and the lower-altitude terrain flight environment is difficult and depends on a mix of procedural (area situation awareness) and positive (spot) control measures. The primary positive means of identification are: 1) visual; 2) military identification friend or foe (IFF) systems; and 3) commercial selective identification features (SIF) systems. Currently, unmanned aerial vehicles have limited ability to detect and avoid other aircraft, are unable to identify their position, and cannot confirm friendly status. Unmanned aerial vehicle avoidance is thus limited to mainly visual detection, which poses an operational hazard and distraction to manned aircraft operating nearby. The development and/or deployment of a feasible solution to locate/identify small unmanned aerial vehicle positions in military airspace has been limited by issues related to cost, size, impact to existing IFF/SIF system, and installation logistics. The same issues have limited the use of unescorted unmanned aerial vehicles in National Airspace System (NAS), the aviation system that enables safe air travel in the United States and over large portions of the world's oceans.

SUMMARY

The present application relates to a transponder-based beacon transmitter system in an unmanned aerial vehicle. The transponder-based beacon transmitter system, in one embodiment, includes a global positioning system interface communicatively coupled to receive position information indicative of a current location of the unmanned aerial vehicle, and a message formatter communicatively coupled to the global positioning system interface. The message formatter formats vehicle identification of the unmanned aerial vehicle and the position information indicative of a current location of the unmanned aerial vehicle into an Automatic Dependent Surveillance Broadcast (ADS-B) mode-select squitter message. The message formatter operates in one of at least three modes, the at least three modes including a military mode, a National Airspace System mode, and a combined military/National Airspace System mode. The transponder-based beacon transmitter system also includes a transponder-based beacon transmitter operable to transmit the automatic dependent surveillance broadcast mode-select squitter messages from the unmanned aerial vehicle. Receivers in the vicinity of the unmanned aerial vehicle receive unsolicited information indicative of the vehicle identification and the vehicle position information.

DRAWINGS

In accordance with common practice, the various described features are not drawn to scale but are drawn to emphasize features relevant to the present invention. Like reference characters denote like elements throughout figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

There is a need for smaller unmanned aerial vehicles to be electronically "seen" and tracked by friendly lower-altitude aircrafts, especially by air cavalry helicopters and fixed-wing close air support (CAS). The present application describes a system and method by which a low size, low weight, and low power package on the unmanned aerial vehicle transmits position information and vehicle identification information to the manned vehicles in the vicinity of the unmanned aerial vehicle without external prompting or a priori knowledge by the manned vehicle. The passive acquisition of the location of an unmanned aerial vehicle by a manned aircraft is obtained from the unsolicited transmit "beacon" signal that transmits the unmanned aerial vehicle location and vehicle identification. This described system and method is implemented without requiring any modification to the helicopters and CAS aircraft, and without any installation and maintenance logistics.

Figure 1:
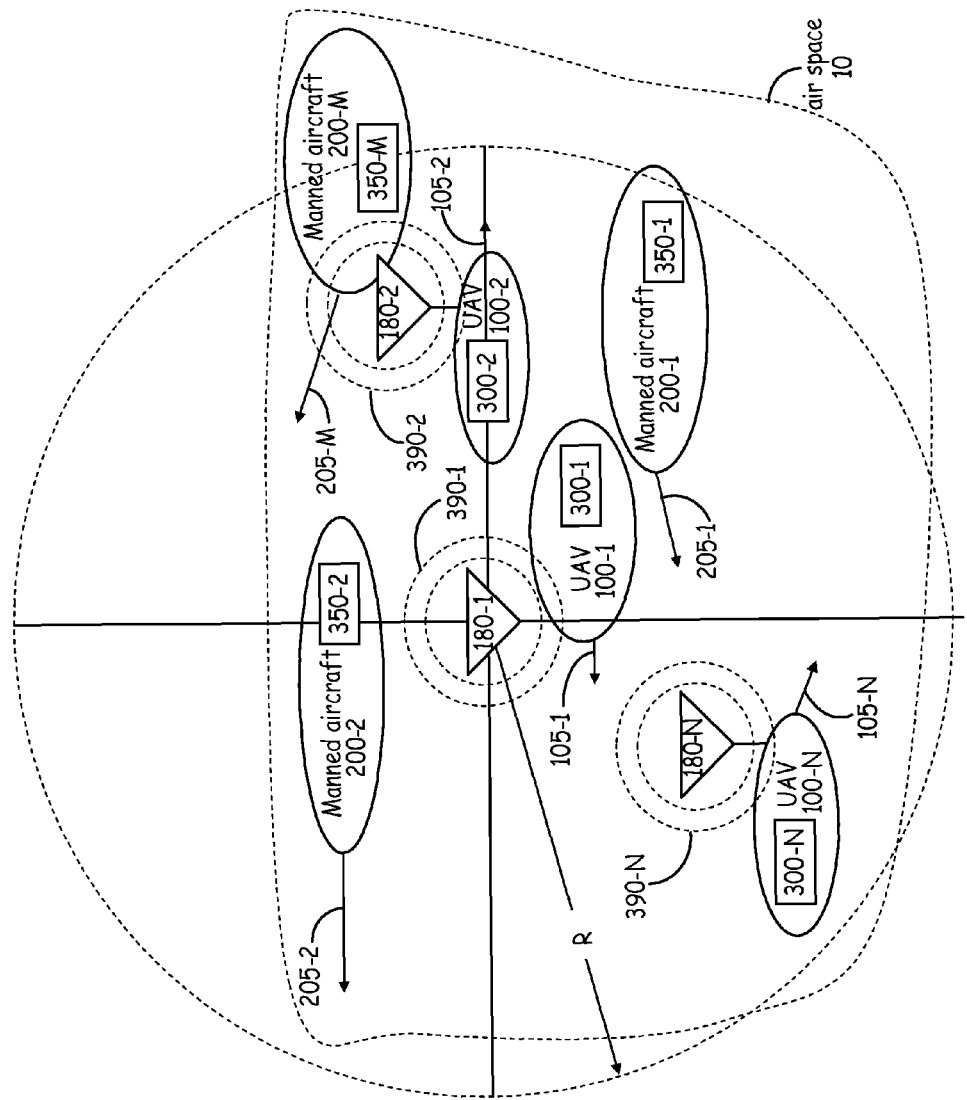
FIG. 1 is a block diagram representative of one embodiment of a plurality of unmanned aerial vehicles and manned aircraft in a congested airspace.

FIG. 1 is a block diagram representative of one embodiment of a plurality of unmanned aerial vehicles 100(1-N) and a plurality of manned vehicles 200(1-M) in a congested airspace 10. The manned vehicles 200(1-M) are also referred to herein as "manned aircraft 200(1-M)." The velocity of each of the plurality of unmanned aerial vehicles 100(1-N) is indicated by a respective vector 105(1-N). The velocity of each of the plurality of the manned aircraft 200(1-M) is indicated by a respective vector 205(1-N). The lengths and directions of the vectors 205(1-M) and 105(1-N) are indicative of a relative speed and direction of movement, respectively.

The manned aircraft 200(1-M) are representative of any type of aircraft, such as helicopters, fixed-wing aircraft, commercial jets, military jets, and the like. The air space 10 is representative of an airspace in which many aircraft, both manned and unmanned, are flying in close quarters at high speeds. The manned aircraft 200(1-M) each include a transceiver 350(1-M), respectively, also referred to herein as "receivers 350(1-M)." To avoid collisions between the unmanned aerial vehicles 100(1-N) and the manned aircraft 200(1-M), the unmanned aerial vehicles 100(1-N) to be electronically "seen" and tracked by the manned aircraft 200(1-M). The unmanned aerial vehicles 100(1-N) are generally smaller than the manned aircraft 200(1-M) and the pilots of the manned aircraft 200(1-M) cannot depend upon visual sighting to avoid collision. For example, the unmanned aerial vehicles 100(1-N) can have a diameter of less than 10 inches and can weigh less than 50 grams. In the event that the air space is an air battle space, the unmanned aerial vehicles 100(1-N) to be electronically "seen" and tracked by friendly manned aircraft 200(1-M).

In one implementation of this embodiment, the vehicles in the vicinity of the unmanned aerial vehicle 100(1-N) are manned military aircraft 200(1-M). When many manned military aircraft 200(1-M) and military unmanned aerial vehicle 100(1-N) are flying in a relatively small air space 10, the military implements systematic management procedures, referred to as electronic warfare airspace deconfliction, to coordinate the use of the electromagnetic spectrum for operations, communications, and intelligence functions. The methods and systems described herein are operable for use in a military airspace deconfliction. Likewise, the methods and systems described herein are applicable, as needed, for airspace deconfliction procedures for use in commercial aircraft that may fly in proximity to military and/or security unmanned aerial vehicles.

The unmanned aerial vehicles 100(1-N) include transponder-based beacon transmitter systems 300(1-N) and respective antennas 180(1-N). The transmit (ADS-B) mode-select (mode-S) squitter messages, represented generally by respective numerals 390(1-N), are transmitted from the antennas 180(1-N). Squitter messages are messages that are transmitted (also referred to herein as "squittered"), intentional or otherwise, of the transponder-based beacon transmitter in the absence of interrogation. The downlink data format of mode-S is used to squitter information such as position, velocity and vehicle identification for military and civilian air traffic. In another implementation of this embodiment, downlink data format of mode-5 is used to squitter information such as position, velocity and vehicle identification for military air traffic.

The receiver of the transceivers 350(1-M) in the manned vehicles 200(1-M) in the vicinity of the unmanned aerial vehicles 100(1-N) receive unsolicited information indicative of the vehicle identification of the unmanned aerial vehicle 100(1-N) and unsolicited position information indicative of the current location of the unmanned aerial vehicle 100(1-N) from the low power squitter messages that have a limited range. In one implementation of this embodiment, the manned vehicles 200(1-M) in the vicinity of the unmanned aerial vehicles 100(1-N) receive unsolicited information indicative of the velocity of the unmanned aerial vehicle 100(1-N).

The vicinity of an unmanned aerial vehicle is based on the detection distance, R, in which a receiver in a manned aircraft 200(1-M) detects signals from an unmanned aerial vehicle 100(1-N). Thus, the vicinity of a unmanned aerial vehicle 100(1-N) is based on the power level of the squitter messages and the directionality of the antenna 180(1-N) on the unmanned aerial vehicle 100(1-N). For example, if the antennas 180(1-N) emit omni-directional signals, the vicinity for each unmanned aerial vehicle 100(1-N) equals the volume $4/3\pi R^3$ of airspace, assuming the unmanned aerial vehicle 100(1-N) is at least a distance R above the earth. Each unmanned aerial vehicle 100(1-N) has a separate vicinity that is centered about the emitting antenna 180(1-N). If the antennas 180(1-N) emit a narrow signal in all directions of a horizontal plane, the vicinity for each unmanned aerial vehicle 100(1-N) equals about $\pi R^2$. The directionality of the antenna 180(1-N) can include other patterns. As shown in FIG. 1, the air space 10 includes some or all of the vicinities for the unmanned aerial vehicles 100(1-N).

As defined herein, a range is the physical separation between two vehicles, such as the manned aircraft 200-1 and the unmanned aerial vehicle 100-1. The selected power level of the squitter messages is based on a desired avoidance distance (also referred to herein as the detection distance) and the anticipated reaction time of the manned aircraft 200-1. An analysis of commercial unmanned aerial vehicle applications in National Airspace System (NAS) indicate that a 2.5 nautical miles avoidance distance is desired. A squitter message transmitted with a one (1) Watt power level is detected at a maximum of 2.5 nautical miles. A squitter message transmitted with a one (1) Watt power level is a low power squitter and a 2.5 nautical mile range is a limited range. If a shorter detection distance is acceptable, then the squitter message can be transmitted with less than one (1) Watt power level. Table 1 below shows the reaction time in seconds for a manned aircraft 200(1-M) based on the range in nautical miles and for various relative speeds (in knots) between the two aircraft.

TABLE 1

Reaction time as a function of vehicle velocities and physical separation between vehicles

| Range Nautical Miles | 200 knots | 250 knots | 300 knots |
| --- | --- | --- | --- |
| 5 | 90 sec | 72 sec | 60 sec |
| 2.5 | 45 sec | 36 sec | 30 sec |
| 2 | 36 sec | 28.8 sec | 24 sec |
| 1 | 18 sec | 14.4 sec | 12 sec |

Figure 2:
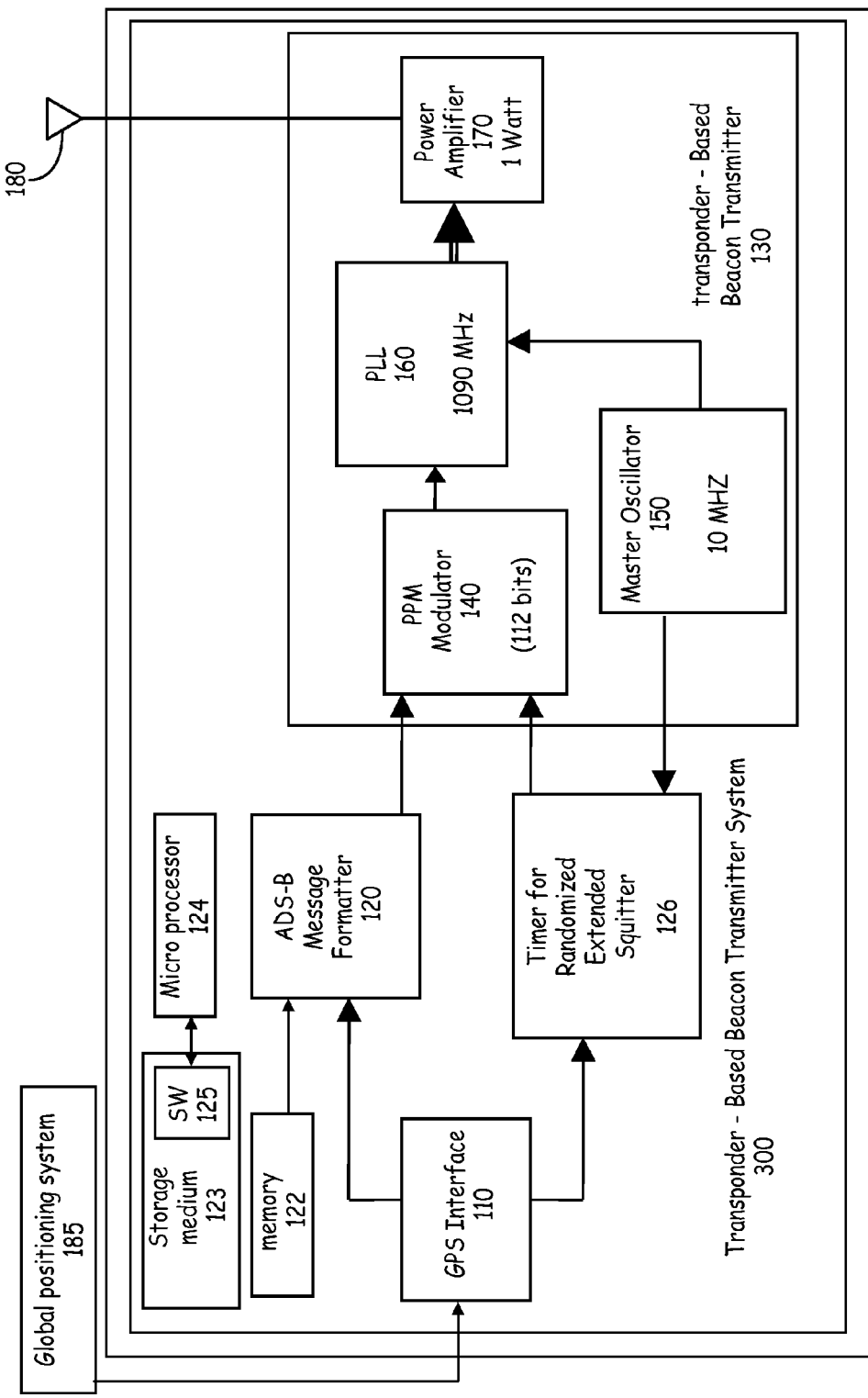
FIG. 2 is one embodiment of a block diagram of a transponder-based beacon transmitter system used on an unmanned aerial vehicle for use in airspace deconfliction.

FIG. 2 is a block diagram of an unmanned aerial vehicle (UAV) 100 equipped with a transponder-based beacon transmitter system 300 for use in a military airspace deconfliction. The transponder-based beacon transmitter system 300 only transmits signals and does not receive signals. In one implementation of this embodiment, the transponder-based beacon transmitter system 300 transmits at 1090 MHz. The transponder-based beacon transmitter system 300 includes a global positioning system interface 110, a message formatter 120, and a transponder-based beacon transmitter 130 operable to transmit the ADS-B mode-select squitter messages from the unmanned aerial vehicle 100. The global positioning system interface 110 is communicatively coupled to receive position information indicative of a current location of unmanned aerial vehicle 110 from a global positioning system 185. The message formatter 120 also referred to herein as an "ADS-B message formatter 120" is communicatively coupled to the global positioning system interface 110. In one implementation of this embodiment, the message formatter 120 is communicatively coupled to receive information indicative of the vehicle identification from a memory 122. In another implementation of this embodiment, the vehicle identification is stored internal to the message formatter 120. The information vehicle identification is unmanned aerial vehicle identification, when the vehicle is an unmanned aerial vehicle 100 as shown in FIG. 2. In yet another implementation of this embodiment, the transmitter 130 is a micro-transmitter.

The transponder-based beacon transmitter system 300 includes also includes a storage medium 123 including software 125, and a microprocessor 124. The microprocessor 124 executes software 125 and/or firmware that causes the microprocessor 124 to perform at least some of the processing described here as being performed by the transponder-based beacon transmitter system 300. At least a portion of such software 125 and/or firmware executed by the microprocessor 124 and any related data structures are stored in storage medium 123 during execution. Memory 91 comprises any suitable memory now known or later developed such as, for example, random access memory (RAM), read only memory (ROM), and/or registers within the microprocessor 124. In one implementation, the microprocessor 124 comprises a microprocessor or microcontroller. Moreover, although the microprocessor 124 and memory 91 are shown as separate elements in FIG. 2, in one implementation, the microprocessor 124 and memory 91 are implemented in a single device (for example, a single integrated-circuit device). The software 125 and/or firmware executed by the microprocessor 124 comprises a plurality of program instructions that are stored or otherwise embodied on a storage medium 123 from which at least a portion of such program instructions are read for execution by the microprocessor 124. In one implementation, the microprocessor 124 comprises processor support chips and/or system support chips such as application-specific integrated circuits (ASICs).

The ADS-B Beacon for Small Unmanned Aerial System (SUAS) provides the ability to operate in NAS (National Airspace System) compatible mode, using MOPS compliant DF18 extended squitters (at much lower power), as well as a DF19 military customized mode. The DF19 military mode follows the same signal in space as a NAS DF18 squitter, and so by casual observation looks like NAS messages as well. However, the military mode allows for unique messages not recognized by the NAS DF18, and can therefore support special information for military tracking/intent/control, as well as secure messaging, anti-spoof and non-exploitable identification/position, and message gateways (from other datalinks). Further, the military mode can include features such as transmit power control, squitter rate control/limiting, and antenna pattern customizations (even beam steering). A variety of flexible DF19 formats may be pre-stored for standard mission, or alternatively, are custom programmable on a per-mission basis, to optimize the limited bandwidth and transmission rate of the transponder-based beacon transmitter system 300.

The transponder-based beacon transmitter system 300 can thus be operated, depending on the scenario and deployment, in one of three modes for which the transponder-based beacon transmitter system 300 is initialized (or reinitialized). The message formatter is initialized or programmed during an initialization process to operate in one of at least three modes. The transponder-based beacon transmitter system 300 can be initialized to operate in a standard NAS mode with only DF18 squitters enabled (for use in benign air traffic control applications in controlled airspace), which is referred to herein as a "National Airspace System mode." The transponder-based beacon transmitter system 300 can be initialized to operate in a military only DF19 mode (with the DF18 squitters disabled) for use in active deployments in restricted or uncontrolled/hostile airspace, referred to herein as a "military mode." The transponder-based beacon transmitter system 300 can also be initialized to operate in a hybrid mode that has both NAS DF18 and military DF19 squitters interlaced (for routine NAS tracking for safety, while employing special military messaging for non-exploitation security and unique information transfer in the mission phase), referred to herein as a "combined military/National Airspace System mode."

In one implementation of this embodiment, one mode is selected and preset before take-off during an initialization (or re-initialization) process. In another implementation of this embodiment, the message formatter is initialized or programmed during an initialization process to operate in more than one of the three modes during the flight. For example, the mode of operation can be changed during flight via a control link. For another example, the mode of operation is programmed to rotate through two or more modes on a pre-set schedule, as loaded prior to takeoff. This gives the unmanned aerial vehicle 100 the opportunity, for example, to take off in a NAS safety-controlled area in a National Airspace System mode, to later operate in a hostile mission phase that may or may not involve ATC tracking (either "military mode" or "combined military/National Airspace System mode), and to then return to the NAS safety zone in National Airspace System mode. Various scripts can be written for the unmanned aerial vehicle 100 that optimizes its profile for numerous types of missions, formations, locations, and scenarios.

The message formatter 120 formats the information indicative of a current location and the vehicle identification of the unmanned aerial vehicle 100 into an ADS-B mode-select (mode S) squitter message. In one implementation of this embodiment, the message formatter 120 formats the information indicative of a current location of unmanned aerial vehicle 100 into an ADS-B mode-select extended squitter message. The Mode S Extended Squitter with ADS-B formatted messages includes information indicative of the identification of the unmanned aerial vehicle 100, the position of the unmanned aerial vehicle 100, and the velocity (direction and magnitude) of the unmanned aerial vehicle 100. Mode S is a discrete selective interrogation rather than a general broadcast, that facilitates traffic collision and avoidance systems (TCAS) for civil aircraft. Mode S transponders ignore interrogations not addressed with their unique identity code, reducing channel congestion. In a typical Secondary Surveillance Radar (SSR) installations the Air Traffic Control Radar Beacon System (ATCRBS), identification friend or foe (IFF), and mode S interrogations are transmitted in an interlaced fashion.

The transponder-based beacon transmitter 130 comprises a modulator 140 that is operable to modulate the position information, the vehicle identification, and, in some cases, the velocity of the unmanned aerial vehicle 100. The transponder-based beacon transmitter 130 also comprises an amplifier 170 that is operable to amplify the modulated position information, the modulated vehicle identification and, in some cases, the modulated velocity of the unmanned aerial vehicle 100. In one implementation of this embodiment, the transmitted ADS-B broadcast formatted mode-select squitter messages have a power level of about 1 Watt. In another implementation of this embodiment, the transmitted ADS-B formatted mode-select squitter messages have a power level of less than 1.5 Watts. In another implementation of this embodiment, the transmitted automatic dependent surveillance broadcast formatted mode-select squitter messages have a power level of less than 2 Watts. In yet another implementation of this embodiment, the modulator 140 is a "pulse position modulation (PPM) modulator 140." In one implementation of this embodiment, the PPM modulator 140 modulates at a rate of 112 bits per second. As shown in FIG. 2, the transponder-based beacon transmitter 130 also includes the 1090 MHz phase lock loop (PLL) 160 and an oscillator 150. In one implementation of this embodiment, the 1090 MHz phase lock loop 160 is gated for on-off keying (OOK). In another implementation of this embodiment, the oscillator is a 10 MHz "master oscillator 150."

The transponder-based beacon transmitter system 300 also includes a timer 126 for randomized squitter so the ADS-B mode-select squitter messages are quasi-periodically transmitted. In one implementation of this embodiment, the ADS-B mode-select squitter messages are transmitted according to a timer specified rate set by the timer 126. The transmit rate depends on type of message. In one implementation of this embodiment, the ADS-B mode-select squitter messages are randomized so the position and vehicle identification message is transmitted every 0.5 seconds ±0.1 second so that each ADS-B mode-select squitter messages is transmitted within 0.4 to 0.6 seconds after the immediately preceding ADS-B mode-select squitter message. The randomization of the transmission reduces collisions with ADS-B mode-select squitter messages being transmitted by other unmanned aerial vehicles 100 that are in the same air space 10.

In one implementation of this embodiment, the global positioning system 185 that is communicatively coupled to global positioning system interface 110 is part of the transponder-based beacon transmitter system 300. In another implementation of this embodiment, the antenna 180 communicatively coupled to the transmitter 130 is part of the transponder-based beacon transmitter system 300.

In one implementation of this embodiment, 4.2 squitter messages are transmitted per second. In this case, the transmit duty cycle is less than 0.03. The Radio Technical Commission for Aeronautics (RTCA) sets the duty cycle for minimum operation performance specification (MOPS) at 3%. In another implementation of this embodiment, the transponder-based beacon transmitter 130 is Identification Friend or Foe (IFF) compliant.

Three (3) nickel-metal hydride (NiMH) AA batteries are sufficient to transmit a 1 Watt squitter message at a 0.05 percent duty for more than eighty days. Thus, the weight of the power source (i.e., the weight of 3 AA batteries) required to power the transponder-based beacon transmitter system 300 is relatively low. It is desirable to reduce the weight of the power source for a transponder-based beacon transmitter system in an unmanned aerial vehicle 100, so that the power required to propel the unmanned aerial vehicle 100 is reduced. In another implementation of this embodiment, nickel-cadmium (NiCd) batteries are used to power the transponder-based beacon transmitter system 300 in the unmanned aerial vehicle 100.

In one implementation of this embodiment, the transponder-based beacon transmitter system 300 is a stand-alone system. As defined herein, a system is a stand-alone system if it is independent of input from any other systems either on-board or off-board of the unmanned aerial vehicle 100 in which the transponder-based beacon transmitter system 300 is located. The transponder-based beacon transmitter system 300 can be a stand-alone system, in part, because of the small size and low weight of the transponder-based beacon transmitter system 300. In one implementation of this embodiment, the volume of the transponder-based beacon transmitter system 300 is less than 6 cubic inches, and the weight of the transponder-based beacon transmitter 300 is less than one pound. In another implementation of this embodiment, the transponder-based beacon transmitter system 300 is less than 4 cubic inches, and the weight of the transponder-based beacon transmitter 300 is less than five ounces. In another implementation of this embodiment, the transponder-based beacon transmitter system 300 receives some signals from another system on the unmanned aerial vehicle 100.

Figure 3:
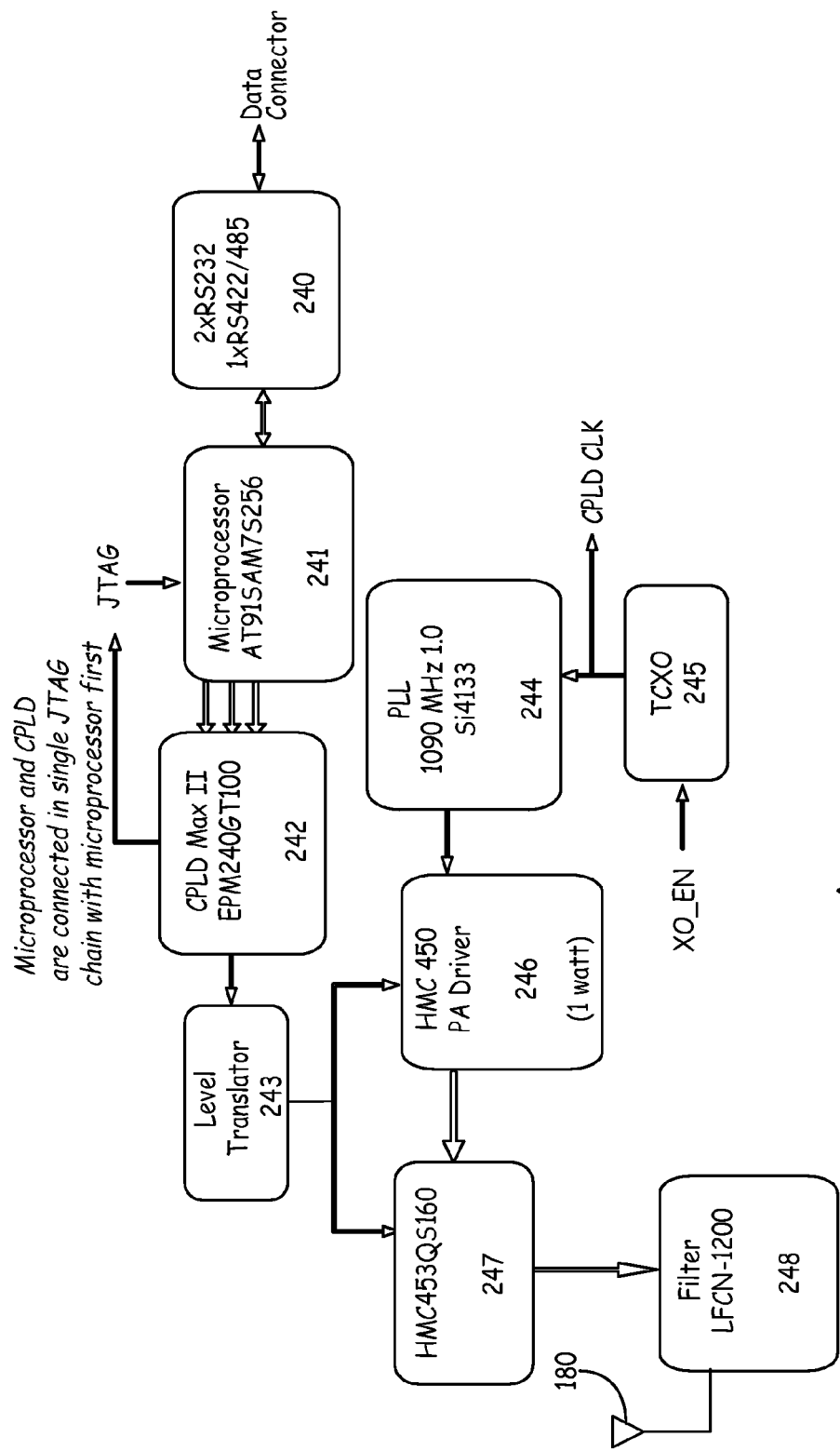
FIG. 3 is an exemplary parts diagram for an exemplary transponder-based beacon transmitter system to allow aircraft to avoid and track unmanned aerial vehicles

FIG. 3 is an exemplary parts diagram for an exemplary transponder-based beacon transmitter system 302 to allow aircraft to avoid and track unmanned aerial vehicles. The transponder-based beacon transmitter system 302 designed to transmit low-power squitter messages is small, low-cost, and light weight. As shown in FIG. 3, data from a global positioning system is received via a data connector at 2× serial ports RS232 and a RS422/485 port 240.

The transponder-based beacon transmitter system 302 in one embodiment includes an ARM7 Processor 241 (50 MHz, 256 KB Flash, 64 KB RAM with 2× serial ports and a RS422/485 port) and a Max-II complex programmable logic device (CPLD) 242. The Max-II complex programmable logic device 242 includes 240 Logic Elements. The Max-II complex programmable logic device outputs data to the level translator 243 which outputs data to the HMC 450 Power amplifier driver 246 and a HMC453QS160 device 247. The HMC453QS160 device 247 also receives power from the HMC 450 Power amplifier driver 246. The HMC453QS160 device 247 outputs data to the LFCN-1200 filter 248. The output of the LFCN-1200 filter 248 is received at the antenna 180. The oscillator (TCXO) 245 inputs signals to the Si4133 phase lock loop 244, which is locked to 1090 MHz. The phase lock loop 244 outputs signals to the HMC 450 Power amplifier driver 246. The transponder-based beacon transmitter system 302 shown in FIG. 3 is a very small transponder-based beacon transmitter for use on small unmanned aerial vehicles that have a diameter of less than 10 inches and a weight of less than 50 grams. Other components can be implemented in the transponder-based beacon transmitter systems described herein.

Figure 4:
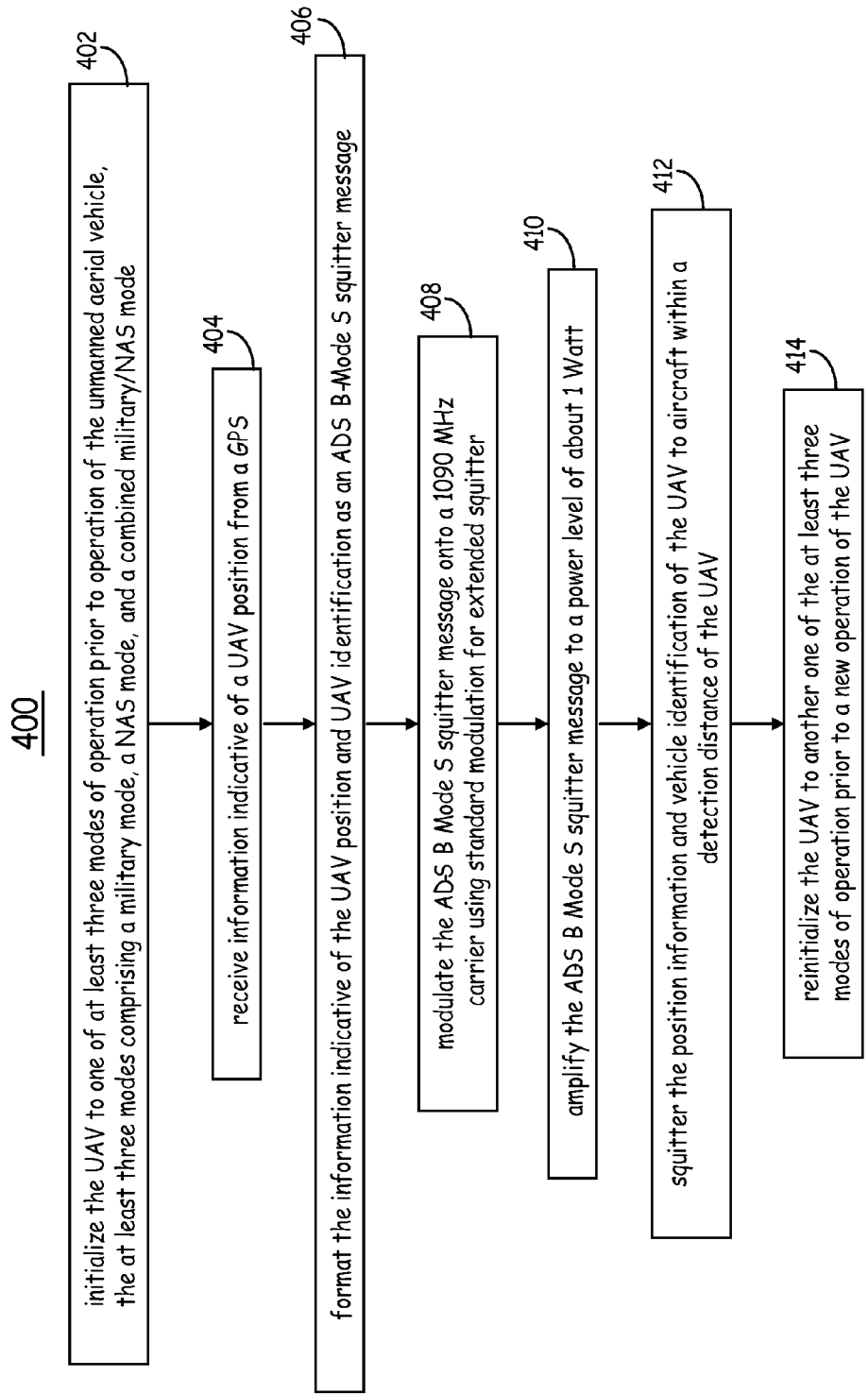
FIG. 4 is a flow diagram of one embodiment of a method of broadcasting unsolicited information about a current position and vehicle identification of an unmanned aerial vehicle in accordance with the present invention.

FIG. 4 is a flow diagram of one embodiment of a method 400 of broadcasting unsolicited information about a current position and vehicle identification of an unmanned aerial vehicle in accordance with the present invention. In one implementation of this embodiment, the unmanned aerial vehicle 100 includes a transponder-based beacon transmitter system 300 as described above with reference to FIGS. 1 and 2. The method 400 is described with reference to the unmanned aerial vehicle 100 shown in FIG. 2 although it is to be understood that method 400 can be implemented using other embodiments of unmanned aerial vehicles as is understandable by one skilled in the art who reads this document. In one implementation of this embodiment, the code required to perform at least one of the steps of method 400 is executed by the microprocessor 124 executing software 125 (FIG. 2). In another implementation of this embodiment, the code required to perform at least one of the steps of method 400 is executed by the message formatter 120 and/or the timer 126 executing software 125 (FIG. 2).

At block 402, the unmanned aerial vehicle 100 is initialized to one of at least three modes of operation prior to operation of the unmanned aerial vehicle 100. The at least three modes are: a military mode; a National Airspace System (NAS) mode; and a combined military/National Airspace System mode as described above. In one implementation of this embodiment, the unmanned aerial vehicle 100 is initialized or programmed to operate in at least two of the at least three modes of operation prior to operation of the unmanned aerial vehicle 100.

At block 404, the unmanned aerial vehicle 100 receives information indicative of an unmanned aerial vehicle position from a global positioning system 185. The unmanned aerial vehicle position can be provided as a longitude, latitude, and altitude of the unmanned aerial vehicle 100. The global positioning system 185 continuously updates the unmanned aerial vehicle position as the unmanned aerial vehicle 100 moves so that the unmanned aerial vehicle 100 is always receiving a current unmanned aerial vehicle position.

At block 406, the information indicative of an unmanned aerial vehicle position and unmanned aerial vehicle identification is formatted as an ADS-B mode-select (Mode-S) squitter message. In one implementation of this embodiment, the unmanned aerial vehicle identification is provided to the ADS-B message formatter 120 from a memory 122 in the transponder-based beacon transmitter system 300. In another implementation of this embodiment, the information indicative of an unmanned aerial vehicle position is formatted as another type of squitter message. In yet another implementation of this embodiment, only information indicative of the unmanned aerial vehicle position is formatted as an ADS-B mode-select (Mode-S) squitter message. In this case, the recipient of the squitter message will not necessarily know if the unmanned aerial vehicle is friend or foe. In yet another implementation of this embodiment, position, velocity and vehicle identification of the unmanned aerial vehicle is formatted as an ADS-B mode-select (Mode-S) squitter message.

At block 408, the ADS-B mode-select squitter message is modulated onto a 1090 MHz carrier using standard modulation for extended squitter. During block 408, the information in the squitter message is modulated onto the 1090 MHz carrier. In another implementation of this embodiment, the ADS-B mode-select squitter message is modulated onto a carrier frequency other than 1090 MHz.

At block 410, the ADS-B mode-select squitter message is amplified to a power level of about 1 Watt. At block 412, the transponder-based beacon transmitter system 300 squitters the position information and vehicle identification of the unmanned aerial vehicle 100 to aircraft, such as manned aircraft 200, within a detection distance of the unmanned aerial vehicle 100. The manned aircraft 200 receiving the position information and the vehicle identification use the position information and the vehicle identification to identify the unmanned aerial vehicle 100 and to avoid collision with the unmanned aerial vehicle 100. The ADS-B mode-select squitter message is quasi-periodically transmitted from the unmanned aerial vehicle 100. In one implementation of this embodiment, the ADS-B mode-select squitter message is quasi-periodically transmitted from the unmanned aerial vehicle 100 at a rate of 0.5 seconds ±0.1 seconds. In another implementation of this embodiment, another type of squitter message is sent from the unmanned aerial vehicle 100.

At block 414, the transponder-based beacon transmitter system 300 in an unmanned aerial vehicle 100 is reinitialized to another one of the at least three modes of operation prior to a new operation of the unmanned aerial vehicle 100. For example, once the unmanned aerial vehicle 100 completes a mission in one mode of operation and lands. The unmanned aerial vehicle 100 can be reinitialized to another mode of operation and then be sent on another mission. In another implementation of this embodiment, the transponder-based beacon transmitter system 300 in an unmanned aerial vehicle 100 is reinitialized to operate in two or more modes of operation prior to a new operation of the unmanned aerial vehicle 100. This allows for a flexible use of the transponder-based beacon transmitter system 300 operating in one of the at least three modes (or operating sequentially in two of the at least three modes) in different unmanned aerial vehicles 100. In embodiments in which the transponder-based beacon transmitter system 300 is a stand-alone system, the transponder-based beacon transmitter system 300 can be moved from one unmanned aerial vehicle to another unmanned aerial vehicle without complex rewiring.

When blocks 402 through 414 are implemented, a manned vehicle in the vicinity of the unmanned aerial vehicle semi-periodically receives identification information and location information for the unmanned aerial vehicle so that the manned vehicle in the vicinity of the unmanned aerial vehicle can track the location of the unmanned aerial vehicle by tracking the location for the identified vehicle. If there is a plurality of unmanned aerial vehicles in the airspace of the manned aircraft, then the manned aircraft can track each of the unmanned aerial vehicles while they are within the vicinity of the manned aircraft based on the vehicle identification for each unmanned aerial vehicle. In one implementation of this embodiment, velocity information about the unmanned aerial vehicle is transmitted to the manned aircraft and processors in the manned aircraft calculate the future location of the unmanned aerial vehicle based on the current location and the current velocity. This provides additional information to the manned aircraft during the 0.4 to 0.6 seconds that elapse between each squittering.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A transponder-based beacon transmitter system in an unmanned aerial vehicle, the transponder-based beacon transmitter system comprising:
   a global positioning system interface communicatively coupled to receive position information indicative of a current location of the unmanned aerial vehicle;
   a message formatter communicatively coupled to the global positioning system interface, the message formatter operable to format vehicle identification of the unmanned aerial vehicle and to format the position information indicative of the current location of the unmanned aerial vehicle into an automatic dependent surveillance broadcast mode-select squitter message, wherein the message formatter operates in a combined military/National Airspace System mode; and
   a transponder-based beacon transmitter operable to transmit the automatic dependent surveillance broadcast mode-select squitter messages from the unmanned aerial vehicle, wherein receivers in the vicinity of the unmanned aerial vehicle receive unsolicited vehicle identification of the unmanned aerial vehicle and position information indicative of the current location of the unmanned aerial vehicle.

2. The transponder-based beacon transmitter system of claim 1, wherein the transponder-based beacon transmitter comprises:
   a modulator to modulate the information indicative of the vehicle identification and the position information of the unmanned aerial vehicle; and an amplifier to amplify the modulated position information and the modulated vehicle identification, wherein the transmitted automatic dependent surveillance broadcast formatted mode-select squitter messages have a power level of 1 Watt.

3. The transponder-based beacon transmitter system of claim 1, further comprising:
a timer to randomized transmission of the squitter messages, wherein the automatic dependent surveillance broadcast mode-select squitter messages are quasi-periodically transmitted.

4. The transponder-based beacon transmitter system of claim 3, wherein the quasi-periodically transmitted automatic dependent surveillance broadcast mode-select squitter messages are transmitted every 0.5 second plus or minus 0.1 seconds.

5. The transponder-based beacon transmitter system of claim 1, further comprising:
a global positioning system communicatively coupled to global positioning system interface.

6. The transponder-based beacon transmitter system of claim 1, further comprising:
an antenna communicatively coupled to the transponder, the antenna operable to squitter the automatic dependent surveillance broadcast mode-select squitter messages.

7. The transponder-based beacon transmitter system of claim 1, wherein the message formatter is initialized during an initialization process to operate in one of at least three modes.

8. The transponder-based beacon transmitter system of claim 1, wherein the transponder-based beacon transmitter is a stand-alone system.

9. The transponder-based beacon transmitter system of claim 1, wherein a volume of the transponder-based beacon transmitter system is less than 6 cubic inches, and a weight of the transponder-based beacon transmitter is less than one pound.

10. The transponder-based beacon transmitter system of claim 1, wherein the transponder-based beacon transmitter transmits at 1090 MHz frequency and the unmanned aerial vehicle is unable to receive signals at the 1090 MHz frequency.

11. The transponder-based beacon transmitter system of claim 1, further comprising:
a memory communicatively coupled to transmit the information indicative of the vehicle identification to the message formatter.

12. A method of broadcasting unsolicited information about a current position and vehicle identification of an unmanned aerial vehicle, the method comprising:
initializing a transponder-based beacon transmitter system in the unmanned aerial vehicle to a combined military/National Airspace System mode of operation prior to operation of the unmanned aerial vehicle;
receiving information indicative of an unmanned aerial vehicle position from a global positioning system at the unmanned aerial vehicle during operation of the unmanned aerial vehicle; and
squittering the position information and a vehicle identification of the unmanned aerial vehicle to aircraft located within a detection distance of the unmanned aerial vehicle, wherein the aircraft receiving the position information and the vehicle identification use the position information and the vehicle identification to identify the unmanned aerial vehicle and to avoid collision with the unmanned aerial vehicle.

13. The method of claim 12, further comprising:
reinitializing the unmanned aerial vehicle to a military mode or a National Airspace System mode of operation prior to a new operation of the unmanned aerial vehicle.

14. The method of claim 12, further comprising:
formatting the information indicative of an unmanned aerial vehicle position and the vehicle identification as an automatic dependent surveillance broadcast mode-select squitter message.

15. The method of claim 14, further comprising:
modulating the automatic dependent surveillance broadcast mode-select squitter message onto a 1090 MHz carrier using standard modulation for extended squitter.

16. The method of claim 14, wherein the squittering comprises:
quasi-periodically transmitting the automatic dependent surveillance broadcast mode-select squitter message from the unmanned aerial vehicle.

17. The method of claim 12, further comprising:
amplifying the automatic dependent surveillance broadcast mode-select squitter message to a power level of less than 1 Watt.

18. The method of claim 17, wherein the squittering comprises:
quasi-periodically transmitting the automatic dependent surveillance broadcast mode-select squitter message from the unmanned aerial vehicle.

19. A computer readable medium encoded with computer instructions stored thereon for a method for broadcasting unsolicited information about a current position and vehicle identification of an unmanned aerial vehicle, the method comprising:
initializing the unmanned aerial vehicle to a combined military/National Airspace System mode;
receiving information indicative of an unmanned aerial vehicle position from a global positioning system in the unmanned aerial vehicle; and
quasi-periodically squittering the position information and vehicle identification of the unmanned aerial vehicle to aircraft located within a detection distance of the unmanned aerial vehicle, wherein the aircraft are able to see, identify, and avoid the unmanned aerial vehicle based on the squittering.

20. The computer readable medium of claim 19, wherein computer instructions stored thereon for a method for quasi-periodically squittering the position information and vehicle identification of the unmanned aerial vehicle comprises:
formatting the information indicative of an unmanned aerial vehicle position and the vehicle identification as an automatic dependent surveillance broadcast mode-select squitter message;
modulating the automatic dependent surveillance broadcast mode-select squitter message onto a 1090 MHz carrier using standard modulation for extended squitter, wherein the automatic dependent surveillance broadcast mode-select squitter message is amplified to a power level of about 1 Watt, and is transmitted from the unmanned aerial vehicle.

* * * * *